US011408866B2

(12) United States Patent
Yamada et al.

(10) Patent No.: US 11,408,866 B2
(45) Date of Patent: Aug. 9, 2022

(54) MASS SPECTROMETRIC DATA ANALYZER AND MASS SPECTROMETRIC DATA ANALYZING PROGRAM

(71) Applicant: SHIMADZU CORPORATION, Kyoto (JP)

(72) Inventors: Yosihiro Yamada, Kyoto (JP); Shinji Funatsu, Kyoto (JP); Keisuke Shima, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 583 days.

(21) Appl. No.: 16/084,679

(22) PCT Filed: Mar. 14, 2016

(86) PCT No.: PCT/JP2016/057943
§ 371 (c)(1),
(2) Date: Feb. 6, 2019

(87) PCT Pub. No.: WO2017/158673
PCT Pub. Date: Sep. 21, 2017

(65) Prior Publication Data
US 2019/0154643 A1  May 23, 2019

(51) Int. Cl.
*G01N 27/62*  (2021.01)
*G06F 17/16*  (2006.01)
*G01N 30/86*  (2006.01)

(52) U.S. Cl.
CPC ......... *G01N 30/8631* (2013.01); *G01N 27/62* (2013.01); *G01N 30/861* (2013.01); *G01N 30/8682* (2013.01); *G06F 17/16* (2013.01)

(58) Field of Classification Search
CPC .. G01N 30/8631; G01N 27/62; G01N 30/861; G01N 30/8682
See application file for complete search history.

(56) References Cited

U.S. PATENT DOCUMENTS 5,644,503 A * 7/1997 Ito .................. G01N 30/8624
702/22
2006/0151688 A1* 7/2006 Castro-Perez ...... H01J 49/0036
250/284

(Continued)

FOREIGN PATENT DOCUMENTS

JP    2008-129700 A    6/2008
JP    2009-008570 A    1/2009

(Continued)

OTHER PUBLICATIONS

Communication dated Jan. 23, 2020 from the European Patent Office in application No. 16894297.7.

(Continued)

*Primary Examiner* — Daniel R Miller
*Assistant Examiner* — Christian T Bryant
(74) *Attorney, Agent, or Firm* — Sughrue Mion, PLLC

(57) ABSTRACT

When a user inputs samples per group, a sample tree and a peak matrix are generated. Peak lists per group are shown in the sample tree, and m/z values and signal strength values from the peak lists are coordinates in the peak matrix. A multivariate analysis is applied to the generated peak matrix. The sample tree, peak matrix, score plot, and loading plot are displayed. When the user clicks a plotted point on the loading plot, a row indicating a corresponding peak on the peak matrix is discriminated. When the user deletes a checkmark corresponding to the discriminated row, the multivariate analysis is applied to the peak matrix from which the peak has been excluded. The score plot and other data are updated. When separation between groups is known from the score plot as failure, the excluded peak may be visually determined as a marker contributing to the group separation.

12 Claims, 7 Drawing Sheets

(56) References Cited

U.S. PATENT DOCUMENTS

| | | | |
|---|---|---|---|
| 2009/0001261 A1* | 1/2009 | Yamaguchi | G01N 30/8675 250/281 |
| 2010/0116981 A1* | 5/2010 | Kajihara | G01N 33/6851 250/282 |
| 2012/0004854 A1* | 1/2012 | Fernandez | G16H 50/20 702/19 |
| 2014/0303903 A1 | 10/2014 | Fujita et al. | |
| 2014/0316717 A1* | 10/2014 | Ikegami | H01J 49/0036 702/23 |
| 2015/0005176 A1* | 1/2015 | Kim | G06F 19/34 506/2 |
| 2016/0071711 A1* | 3/2016 | Ikegami | H01J 49/0036 250/282 |
| 2018/0113101 A1* | 4/2018 | Mao | G01N 30/88 |

FOREIGN PATENT DOCUMENTS

| | | | |
|---|---|---|---|
| JP | 2009025056 A * | 2/2009 | H01J 49/0036 |
| JP | 2011-247869 A | 12/2011 | |
| JP | 2014-202582 A | 10/2014 | |
| WO | 2004106915 A1 | 12/2004 | |
| WO | WO-2007041820 A2 * | 4/2007 | G01N 30/8675 |
| WO | WO-2010116409 A1 * | 10/2010 | H01J 49/26 |

OTHER PUBLICATIONS

Mass++ Beginners' Guide, Copyright c 2006-2014, Shimadzu Corporation, Eisai Co., Ltd., XP055515175, 116 pages.

Yuichiro Fujita et al., "Mass++: Statistical and multivariate analysis functions for differential analysis", 61st Annual Conference on Mass Spectrometry, online search on Feb. 25, 2016, p. 1.

Maiko Kusano et al., "Multivariate Statistical Analysis of Epidermal Surface Lipids Obtained through Noninvasive Sampling", 38th Japanese Society for Biomedical Mass Spectrometry, Annual meeting, poster presentation, 2013, 1 pg.

Yuichiro Fujita et al., "Novel preprocessing method to align retention time of LC-MALDI and new implemented functions in Mass++ for differential analysis", 61th ASMS Conference on Mass Spectrometry, poster presentation, 2013, 1 pg.

Written Opinion of the International Searching Authority for PCT/JP2016/057943 dated May 31, 2016 (PCT/ISA/237).

International Preliminary Report on Patentability for PCT/JP2016/057943 dated Sep. 18, 2018 (PCT/IB/373).

* cited by examiner

Fig. 8
| m/z | Group1 | | | ---- | Group2 | ---- |
|---|---|---|---|---|---|---|
| | List1-01 | List1-02 | List1-03 | ---- | List2-01 | ---- |
| 2369.87 | — | — | — | ---- | — | ---- |
| 2396.18 | 2.87E+06 | 1.25E+06 | 5.48E+06 | ---- | 2.53E+05 | ---- |
| 2410.12 | 5.90E+05 | 1.49E+05 | 1.19E+06 | ---- | — | ---- |
| 2434.22 | 5.21E+05 | 3.25E+05 | 7.50E+05 | ---- | — | ---- |
Peak (m/z value) ↓   Sample →
Fig. 9
(a) Example of Score Plot
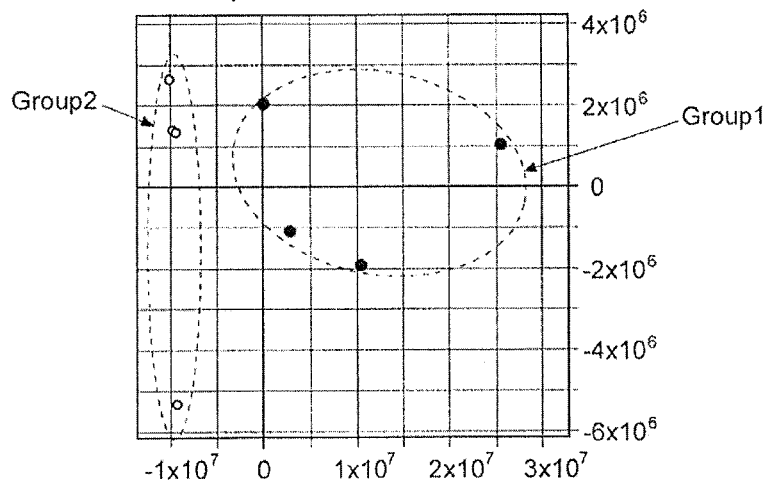
(b) Example of Loading Plot
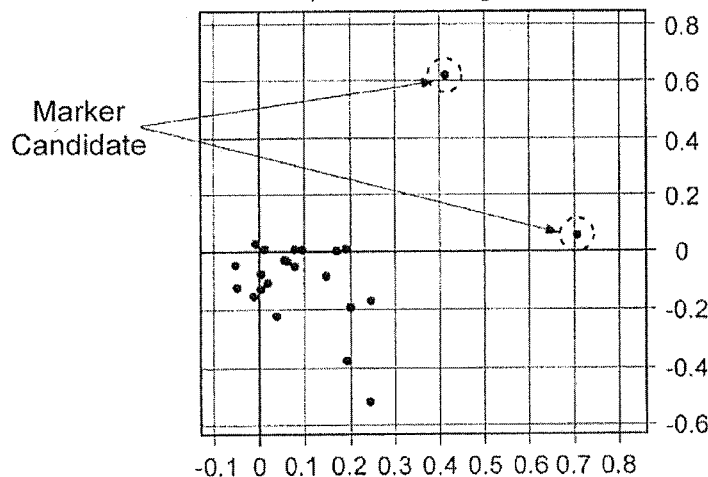

MASS SPECTROMETRIC DATA ANALYZER AND MASS SPECTROMETRIC DATA ANALYZING PROGRAM

CROSS REFERENCE TO RELATED APPLICATIONS

This application is a National Stage of International Application No. PCT/JP2016/057943 filed Mar. 14, 2016.

TECHNICAL FIELD

The present invention relates to an apparatus for analyzing mass spectrometric data obtained by mass spectrometry and a computer program for use in the analysis, more particularly to a mass spectrometric data analyzer and a computer program for use in the analysis that are suitably used in differential analysis between a plurality of sample groups.

BACKGROUND ART

There are ongoing studies on biomarker analysis using mass spectrometry with aims to realize early diagnosis of specific diseases and disorders and to verify therapeutic effects, which have partly been used in real clinical settings. For example, if any substance is found that is barely present or not present at all in biological samples including blood and urine collected from healthy subjects but is evidently present in similar biological samples collected from patients affected with a disorder, for example, cancer, the substance may be a promising biomarker candidate. Biomarkers are also used to identify and/or determine species and strains of microorganisms such as bacteria. Such biomarkers are typically searched by measuring samples derived from two or more groups using a mass spectrometer and performing differential analysis between the groups based on the obtained data.

A conventional process to search markers (hereinafter, simply referred to as "markers", because they are not necessarily organism-derived markers) using differential analysis is schematically described below (Patent Literature 1, Non-Patent Literatures 1 to 3). In the description below, "G" refers to the total number of groups, and "S" refers to the total number of samples.

[Step 1] First, mass spectrometric data of each sample is obtained and subjected to a peak detecting process to collect peak information, i.e., mass-to-charge ratio and signal strength values of each peak. The peak information is coordinated in the form of a peak list per sample. The peak list is a list of signal strength values associated with and arranged in the order of mass-to-charge ratio values of the peaks. The number of peak lists is S in total, which may be divided into G number of groups.

[Step 2] One peak list, i.e., a peak list of one sample is defined as a column vector, and all of the peak lists are arranged in the row direction, i.e., lateral direction so that the signal strength values relative to the same mass-to-charge ratio value are lined up in the same row. The table thus obtained is a peak matrix. In the peak matrix, the peak lists are put together per group in the row direction. In the obtained peak matrix, the number of columns is "S" which is equal to the total number of samples, and the number of rows is equal to the total number "P" of peaks observed in the whole samples (except any overlapping peaks having mass-to-charge ratio values within a range of thresholds, which are counted as 1). FIG. 8 shows an example of the peak matrix. In the illustrated example, the number of groups, "G", is two.

[Step 3] The columns in the peak matrix are regarded as "S" number of P-dimensional vectors obtained from the "G" number of groups, to which a predetermined multivariate analysis is applied, for example, principal component analysis (PCA) or partial least squares-discriminant analysis (PLS-DA). Then, a degree of separation between groups and candidates of peaks contributing to the separation between groups (mass-to-charge ratio values) are grasped from the obtained multivariate analysis result.

When the peak matrix is subjected to the PCA or PLS-DA, for example, a score plot or a loading plot may be obtained. The score plot is obtained by projecting the columns in the peak matrix on a low-dimensional space. The loading plot is a graphical representation of components in the rows and columns in the peak matrix converted into the score plot. FIG. 9 are drawings that illustrate examples of the score plot and the loading plot obtained by PCA. In the score plot illustrated in FIG. 9($a$), plotted points respectively illustrated with a white circle and a black circle indicate samples of different groups. As illustrated with a dotted line in the figure, the score plot may be useful for visual confirmation of a degree of separation between different groups.

In the loading plot illustrated in FIG. 9($b$), plotted points respectively indicate the rows, i.e., peaks, in the peak matrix. In the loading plot, points indicative of peaks that significantly differ in signal strength between different groups are typically plotted in a region with greater absolute values on a first axis (lateral axis). Therefore, a loading value with a greater absolute value on the first axis suggests a peak more contributing to the separation between groups. In the example illustrated in FIG. 9($b$), two plotted points circled with a dotted line may be peaks contributing to the separation between groups, which are prospective marker candidates. Thus, the loading plot may be useful for identifying any peak contributing to the separation between groups, i.e., marker candidate.

Yet, all of the peaks thus extracted based on the loading plot are not necessarily expected to contribute to the separation between groups. In case a sample contains a large number of components, leading to too many peaks, or a mass spectrum is inferior in quality due to noise peaks, a marker candidate extracted based on the loading plot is often found unusable as a marker. The differential analysis described above, therefore, may require a user (analyst) to confirm whether a peak selected as a marker candidate from the multivariate analysis result is truly contributing to the separation between groups. In the case of more than one marker candidate, a user may need to decide which one of the marker candidates is the most qualified marker.

To allow a user to make such a decision or confirmation, a peak matrix is generated again from which the marker candidate peaks have been excluded, and is subjected to the same multivariate analysis. Then, whether the separation between groups is feasible may be clarified based on the obtained multivariate analysis result. This is, however, an effortful, time-consuming work. Another problem may be errors, for example, accidental removal of peaks that should remain undeleted during the process to generate, from the multivariate analysis result, a peak matrix from which peaks assumed to be the marker candidates have been excluded.

CITATION LIST

Patent Literature

Patent Literature 1: JP 2014-202582 A

Non Patent Literature

Non Patent Literature 1: "Mass++: Statistical and multivariate analysis functions for differential analysis", Yuichiro Fujita, et al. (9 other authors), presentation materials for the 61st Annual Conference on Mass Spectrometry, online search on Feb. 25, 2016.
Non Patent Literature 2: "Novel preprocessing method to align retention time of LC-MALDI and new implemented functions in Mass++ for differential analysis", Yuichiro Fujita, et al. (10 other authors), the 61th ASMS Conference on Mass Spectrometry), poster presentation, 2013
Non Patent Literature 3: "Multivariate analysis for body surface components collected by non-invasive method", Maiko Kusano et al. (4 other authors), the 38th Japanese Society for Biomedical Mass Spectrometry, Annual meeting, poster presentation, 2013

SUMMARY OF INVENTION

Technical Problem

The present invention has been accomplished to address the issues of the known art and is directed to providing an apparatus for analyzing mass spectrometric data and a program for analyzing mass spectrometric data that may provide efficient and accurate search of a marker candidate contributing to the separation between a plurality of groups based on a multivariate analysis result.

Solution to Problem

To address the issues of the known art, a mass spectrometric data analyzer is provided that searches an element selectable as a marker contributing to the separation between a plurality of groups based on mass spectrometric data obtained through mass spectrometry of a plurality of samples each belonging to any one of the plurality of groups. The mass spectrometric data analyzer includes:

a) a peak matrix generator that arranges mass-to-charge ratio values of peaks on a mass spectrum in a row or column direction and arranges pieces of information for distinguishing the plurality of samples in the row or column direction based on the mass spectrometric data of given ones of the plurality of samples so as to generate a peak matrix in which signal strength values of the peaks are put as the elements;

b) a multivariate analyzer that applies a predetermined multivariate analysis to the peak matrix generated by the peak matrix generator or a peak matrix obtained by excluding from the peak matrix a peak designated by the peak-to-be excluded designator described later and that renders a multivariate analysis result in a graphical representation, the predetermined multivariate analysis being applied to group the plurality of samples or calculate a distance between the plurality of samples;

c) a display processor that displays the peak matrix and the graphical representation of the multivariate analysis result on a display screen;

d) a selected peak indicator that specifies, in response to desired one or more plotted points being designated by a user on the graphical representation of the multivariate analysis result displayed on the display screen, a row or a column in the peak matrix indicative of a peak corresponding to the desired one or more plotted points and that discriminates the row or the column specified in the peak matrix displayed on the display screen; and e) a peak-to-be-excluded designator that allows the user to designate a peak to be desirably excluded from multivariate analysis targets on the peak matrix displayed on the display screen.

A mass spectrometric data analyzing program is further provided that searches an element selectable as a marker contributing to the separation between a plurality of groups based on mass spectrometric data obtained through mass spectrometry of a plurality of samples each belonging to any one of the plurality of groups. The mass spectrometric data analyzing program causes a computer to carry out the following steps:

a) a peak matrix generating step of arranging mass-to-charge ratio values of peaks on a mass spectrum in a row or column direction and arranging pieces of information for distinguishing the plurality of samples in the row or column direction based on the mass spectrometric data of given ones of the plurality of samples so as to generate a peak matrix in which signal strength values of the peaks are put as the elements;

b) a multivariate analyzing step of applying a predetermined multivariate analysis to the peak matrix generated in the peak matrix generating step or a peak matrix obtained by excluding from the peak matrix a peak designated in the peak-to-be-excluded designating step described later and of rendering a multivariate analysis result in a graphical representation, the predetermined multivariate analysis being applied to group the plurality of samples or calculate a distance between the plurality of samples;

c) a display processing step of displaying the peak matrix and the graphical representation of the multivariate analysis result on a display screen;

d) a selected peak indicating step of specifying, in response to desired one or more plotted points being designated by a user on the graphical representation of the multivariate analysis result displayed on the display screen, a row or a column in the peak matrix indicative of a peak corresponding to the desired one or more plotted points and of discriminating the row or the column specified in the peak matrix displayed on the display screen; and e) a peak-to-be-excluded designating step of allowing the user to designate a peak to be desirably excluded from multivariate analysis targets on the peak matrix displayed on the display screen.

The multivariate analysis typically used in the mass spectrometric data analyzer and mass spectrometric data analyzing program may be PCA or PLS-DA, or one selected from algorithms developed by improving PCA or PLS-DA. Such a multivariate analysis provides a loading plot as the graphical representation rendered by the multivariate analyzer and displayed on the display screen by the display processor.

The mass spectrometric data analyzer according to the present invention offers a peak list containing, for example, mass spectrometric data obtained through mass spectrometry of samples known to belong to a plurality of groups or peak information detected by subjecting each mass spectrum to a peak detecting process executed according to a predetermined algorithm. In the event that the former data is used, the peak detecting process may be executed by the mass spectrometric data analyzer described herein to generate the peak list.

In the mass spectrometric data analyzer according to the present invention, the peak matrix generator generates a peak matrix based on per-sample peak lists. The first peak matrix thus generated contains pieces of peak information of all of the given samples. Next, the multivariate analyzer applies the multivariate analysis, such as PCA or PLS-DA, to the peak matrix to generate, for example, a score plot and a loading plot as the graphical representation of the obtained multivariate analysis result. The display processor displays the peak matrix and graphs showing the multivariate analysis result on the display screen, such as a monitor, of the display processor.

As described earlier, plotted points on the loading plot respectively correspond to the peaks listed in the peak matrix, and positions of the plotted points on the loading plot often represent degrees of contribution to the separation of samples between different groups. A user may select a plotted point assumed to contribute to the separation of samples on the loading plot. Then, the user may click and point to the plotted point using a pointing device. Instead of one plotted point, the user may select a plurality of plotted points. The loading plot may be configured to graphically indicate a desired range to allow the user to point to one or more plotted points by selecting a certain range, instead of pointing to each plotted point.

The selected peak indicator, in response to one or more plotted points being pointed, identifies a row or column in the peak matrix indicative of a peak corresponding to each plotted point. One plotted point corresponds to one row or one column in the peak matrix. On the peak matrix displayed on the display screen, the specified row or column may be shown so as to distinguish the row or column from the other rows or columns, for example, information in the row or column may be presented in a different color, or its background color or text color may be changed. Then, the user may visually recognize the row or column on the peak matrix corresponding to each plotted point selected by the user on the graph showing the multivariate analysis result (i.e., loading plot).

While the peak thus discriminated may be a marker candidate, it is still uncertain whether this peak is truly a marker. A user, who wants to be certain that the marker candidate is a suitable marker, prompts the peak-to-be-excluded designator to exclude the peak corresponding to the row or column discriminated on the peak matrix from multivariate analysis targets. This peak exclusion is desirably readily done by, for example, checking or unchecking a checkbox provided in each row or column of the peak matrix. After one or more peaks are excluded by the peak-to-be-excluded designator, the multivariate analyzer applies the multivariate analysis to the peak matrix from which the designated peak has been removed. Then, the display processor updates the graph showing the multivariate analysis result on the display screen.

In case the peak excluded by the peak-to-be-excluded designator is a marker, grouping of the samples should fail in the multivariate analysis based on the peak matrix from which the designated peak has been removed. Then, the user determines the degree of separation of samples between groups on the graph showing the multivariate analysis result, for example, the score plot, and may draw the conclusion that the designated and removed peak is a suitable marker when the grouping fails. When the user confines that the samples are correctly separated between groups which they should belong to, the peak excluded earlier may be determined as not contributing at all or only partly contributing to the sample separation. If necessary, plotted points of a different marker candidate may be specified on the loading plot, as described earlier, to determine whether the marker candidate is a suitable one.

In the case of three or more groups, a certain marker alone may be unlikely to contribute to the separation among these groups. It is most likely that a marker contributes to the separation between one group A and the other groups and another marker contributes to the separation between one group B apart from the group A and the other groups. In case the number of groups is three or more, there are typically more than one marker, and groups selected for separation may differ with each one of the markers. In such a case, when a marker contributing to the separation relating to a group is successfully identified, data originating from samples belonging to the group is excluded from analysis targets, and a next potential marker is searched based on data obtained from the remaining samples. This may allow for more efficient marker search.

The mass spectrometric data analyzer according to the present invention may further include a group-to-be-excluded designator that allows a user to designate desired one or more than one of the plurality of groups to be desirably excluded from multivariate analysis targets. The mass spectrometric data analyzer may be further characterized in that the peak matrix generator generates a peak matrix based on the mass spectrometric data of any samples but samples included in the desired one or more than one of the plurality of groups designated by the group-to-be-excluded designator, and the multivariate analyzer applies a predetermined multivariate analysis to the peak matrix generated after the samples included in the desired one or more than one of the plurality of groups are excluded or a peak matrix obtained by excluding from the peak matrix the peak specified by the peak-to-be-excluded designator.

For example, the group-to-be-excluded designator displays, on the display screen, pieces of information of all of the groups which the samples belong to (groups identifiers such as group numbers) and corresponding checkboxes, so that any group to be desirably excluded is designated by checking or unchecking a corresponding one of the checkboxes.

In the case of a large number of groups, leading to a large number of markers contributing to the separation between groups, the mass spectrometric data analyzer thus further characterized may efficiently decide any suitable marker while determining whether each candidate assumed to be a marker is truly contributing to the separation between groups.

Advantageous Effects of Invention

When conducting search of a marker contributing to the separation of a large number of samples between a plurality of groups, the mass spectrometric data analyzer and analyzing program provided by the present invention may allow for pinpointing and facilitated visual confirmation of whether a marker candidate peak is truly contributing to the separation between groups. The marker search may be accordingly improved in efficiency and accuracy.

BRIEF DESCRIPTION OF DRAWINGS

FIG. 8 shows an exemplified peak matrix.

FIG. 9 is a drawing of examples of a score plot and a loading plot obtained by PCA in marker search using differential analysis.

DESCRIPTION OF EMBODIMENTS

Figure 1:
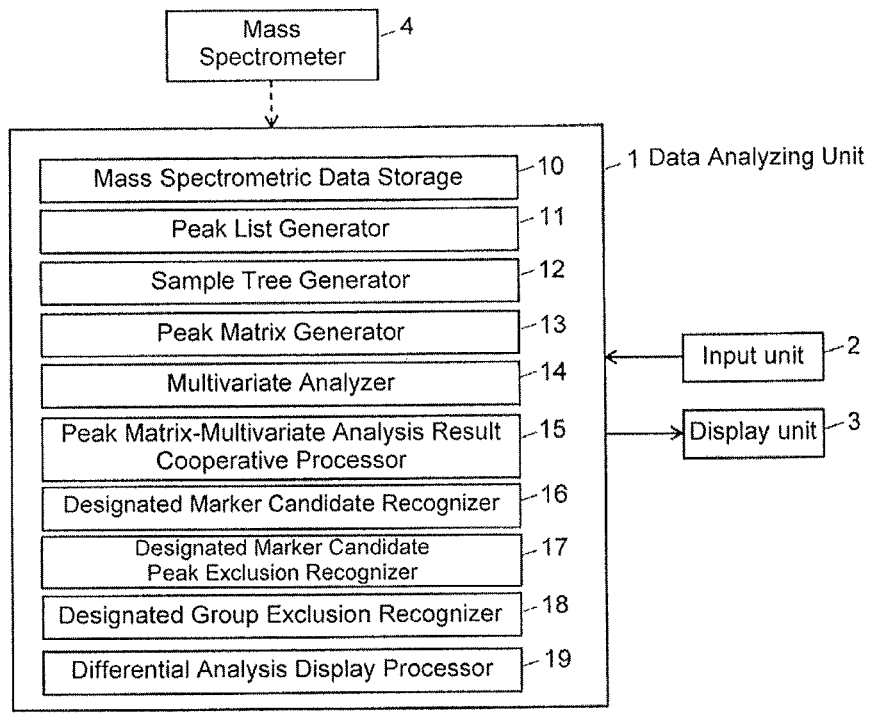
FIG. 1 is a schematic block diagram of a mass spectrometric data analyzer according to an embodiment of the present invention.

An embodiment of the mass spectrometric data analyzer according to the present invention is hereinafter described referring to the accompanying drawings. FIG. 1 is a schematic block diagram of the mass spectrometric data analyzer according to the embodiment.

The mass spectrometric data analyzer according to the embodiment is provided with: a data analyzing unit 1 including the following structural elements as functional blocks; a mass spectrometric data storage 10, a peak list generator 11, a sample tree generator 12, a peak matrix generator 13, a multivariate analyzer 14, a peak matrix-multivariate analysis result cooperative processor 15, a designated marker candidate recognizer 16, a designated marker candidate peak exclusion recognizer 17, a designated group exclusion recognizer 18, and a differential analysis display processor 19. The apparatus is further provided with an input unit 2 used by a user (analyst) to receive data and instructions, and a display unit 3 on which an analysis result is displayable.

The data analyzing unit 1 is typically a personal computer or a more sophisticated computer like a workstation, in which dedicated data analysis software is installed. The functional blocks are effectuated by running the software on the computer. In the apparatus thus configured, the input unit 2 is a pointing device including a keyboard and mouse of a computer, and the display unit 3 is a monitor. The data analysis software installed in the computer is comparable to the mass spectrometric data analyzing program according to the present invention.

Predetermined samples are analyzed by mass spectrometry in a mass spectrometer 4, and mass spectrometric data within a predetermined range of mass-to-charge ratios are accordingly obtained. The obtained mass spectrometric data is then transmitted to the data analyzing unit 1 and stored in the mass spectrometric data storage 10. In the mass spectrometric data storage 10 are storable the mass spectrometric data obtained by one specific mass spectrometer 4 alone or mass spectrometric data similarly obtained by different mass spectrometers. Mass spectrometric data of a large number of samples analyzed by the data analyzing unit 1 may be obtained by one particular mass spectrometer or by different mass spectrometers, without any particular restriction on analyzable data.

In either case, pieces of mass spectrometric data of a large number of samples are storable in the mass spectrometric data storage 10. At predetermined timings, the peak list generator 11 detects peaks in each piece of mass spectrometric data according to a predetermined algorithm and obtains positions (mass-to-charge ratio values) and signal strength values of the detected peaks. Then, the peak list generator 11 generates a peak list containing a large number of combinations of mass-to-charge ratio values Mp and signal strength values Ip (Mp, Ip, where p=1, 2, ... ) for each mass spectrum. Then, the peak list generator 11 generates data files in which peak lists are stored per sample, and stores the data files in the mass spectrometric data storage 10.

Prior to the start of marker search using differential analysis, the data files containing peak lists associated with a large number of samples are already stored in the mass spectrometric data storage 10. As a known fact, these multiple samples each belong to any one of a plurality of groups. Supposing there are two groups which are a group of patients affected with a particular disease and a group of healthy subjects, for example, blood and/or urine collected from the patients are samples of the patient group, and blood and/or urine collected from healthy subjects are samples of the healthy subject group.

Figure 3:
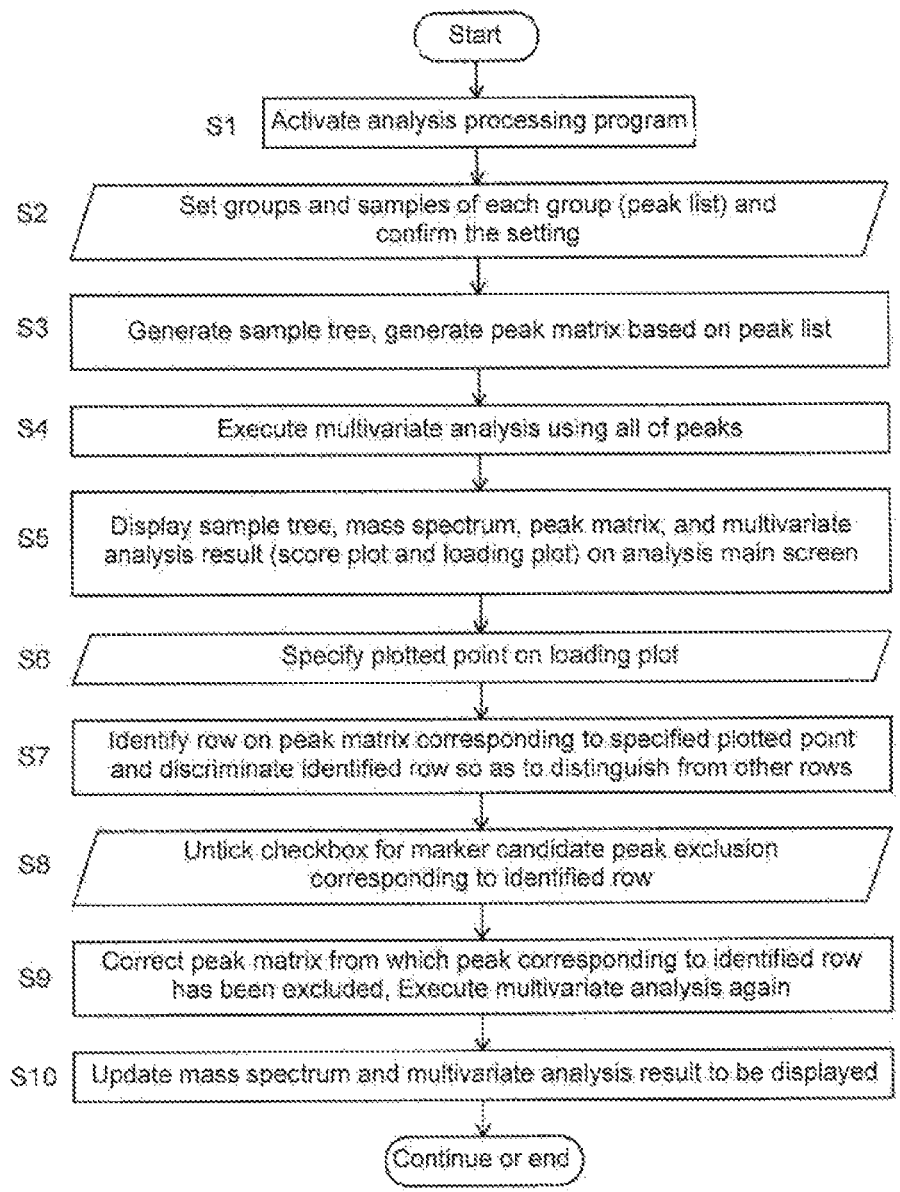
FIG. 3 is a flow chart of operational and processing steps of marker search carried out by the mass spectrometric data analyzer according to the embodiment.

Operational and processing steps of the differential analysis-based marker search are hereinafter described referring to the flow chart of FIG. 3. In the description given below, there are two groups; Group 1, and Group 2.

Figure 2:
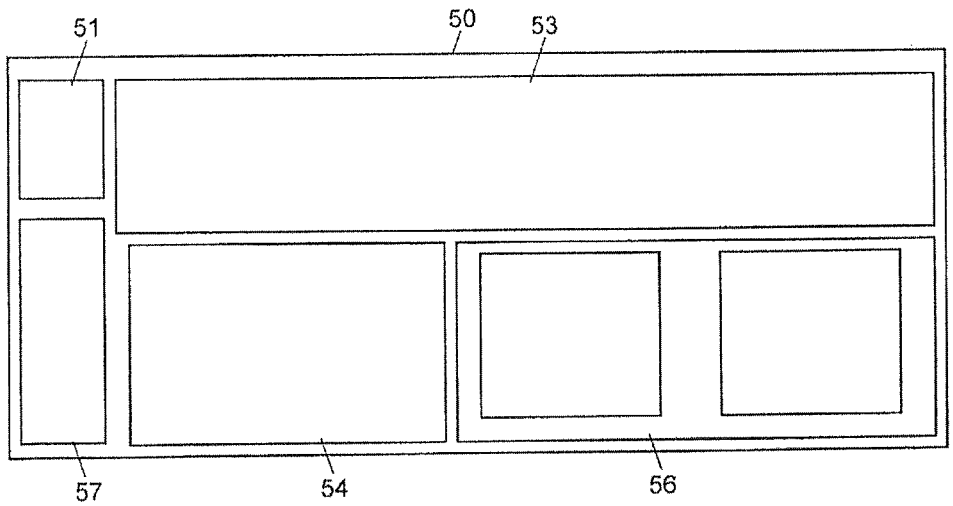
FIG. 2 is a schematic diagram of the layout of regions on an analysis main screen displayed on a display unit of the mass spectrometric data analyzer according to the embodiment.

A user performs a predetermined operation using the input unit 2 to activate an analysis processing program. Then, a predetermined analysis main screen (initial screen) is displayed on the monitor of the display unit 3 (Step S1). FIG. 2 is a schematic diagram of the layout of regions on an analysis main screen 50. Though details of the analysis main screen 50 will be described later, this screen is divided in the following regions; sample tree display region 51, mass spectrum display region 53, peak matrix display region 54, multivariate analysis result display region 56, and analysis condition setting region 57.

Figure 4:
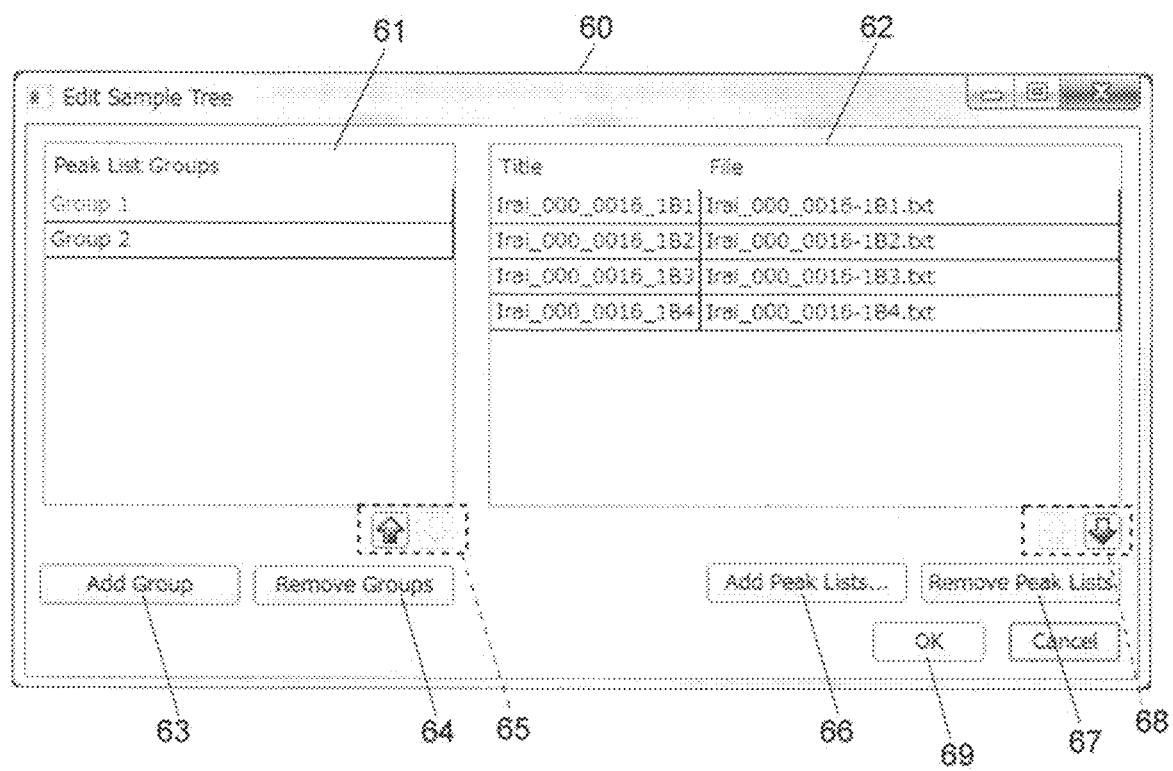
FIG. 4 is a drawing of an exemplified "Edit Sample Tree" dialog box in the mass spectrometric data analyzer according to the embodiment.

When the user further performs a predetermined operation using the input unit 2, the sample tree generator 12 displays an "Edit Sample Tree" dialog box 60, which is illustrated in FIG. 4, on the analysis main screen 50. The "Edit Sample Tree" dialog box 60 includes a group setting region 61 and a sample setting region 62. The user clicks an "Add Group" button 63 and a "Remove Groups" button 64 on the dialog box 60 to set a desired number of groups. While two groups; Group 1 and Group 2, are set in the example illustrated in FIG. 4, more than two groups may be set on the dialog box.

Subsequent to the group setting, the user points to one of the groups using an arrow button 65 and then selects one of the data files containing peak lists of a sample belonging to the selected group. Then, the sample tree generator 12 reads the name of the selected peak list-containing data file into the sample setting region 62. The names of peak list-containing data files displayable on the sample setting region 62 may be added and deleted via an "Add Peak Lists" button 66, a "Remove Peak Lists" button 67, and an arrow button 68. By manipulating these buttons, peak list-containing data files associated with all of the target samples are set for different groups. After the setting is completed, the user clicks an "OK" button 69 to instruct a sample tree to be generated (Step S2).

Correspondingly, the sample tree generator 12 generates, based on the groups and the names of their peak list-containing data files, a sample tree in which names of the peak list-containing data files are listed per group. In the example of FIG. 4 showing two groups; Group 1 and Group 2, a sample tree is generated, as drawn in the sample tree display region 51 on the analysis main screen 50 illustrated in FIG. 5. Alongside the sample tree being generated, the peak matrix generator 13 reads data from the peak list-containing data files listed in the sample tree and coordinates the read data to generate a peak matrix (Step S3). In the peak matrix generated, mass-to-charge ratio values of all of the peaks are vertically arranged and the samples (peak list-containing data files) are laterally arranged, as described earlier referring to the example of FIG. 8.

Figure 5:
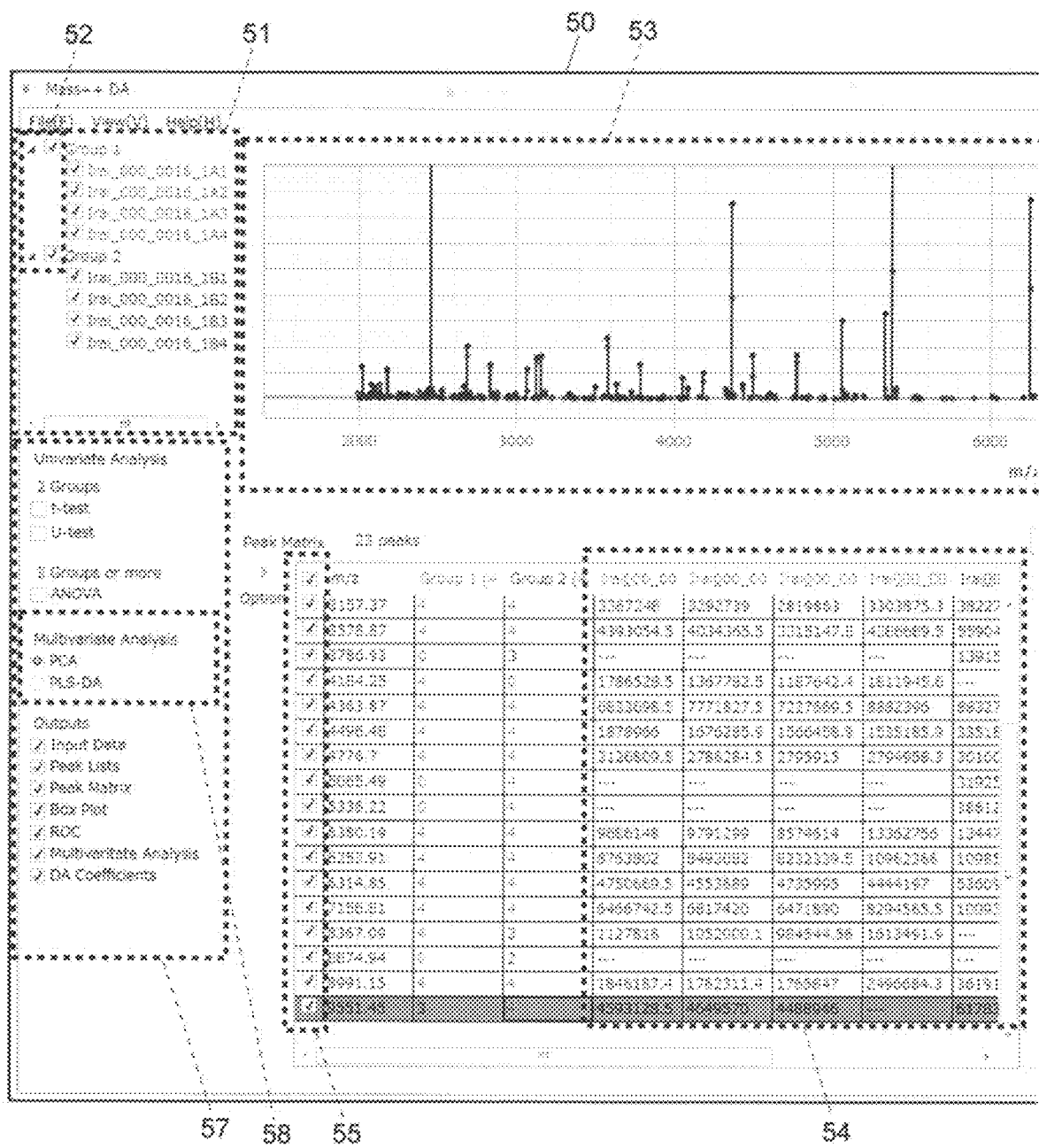
FIG. 5 is a drawing of an exemplified display (left half) on the analysis main screen in the mass spectrometric data analyzer according to the embodiment.
Figure 6:
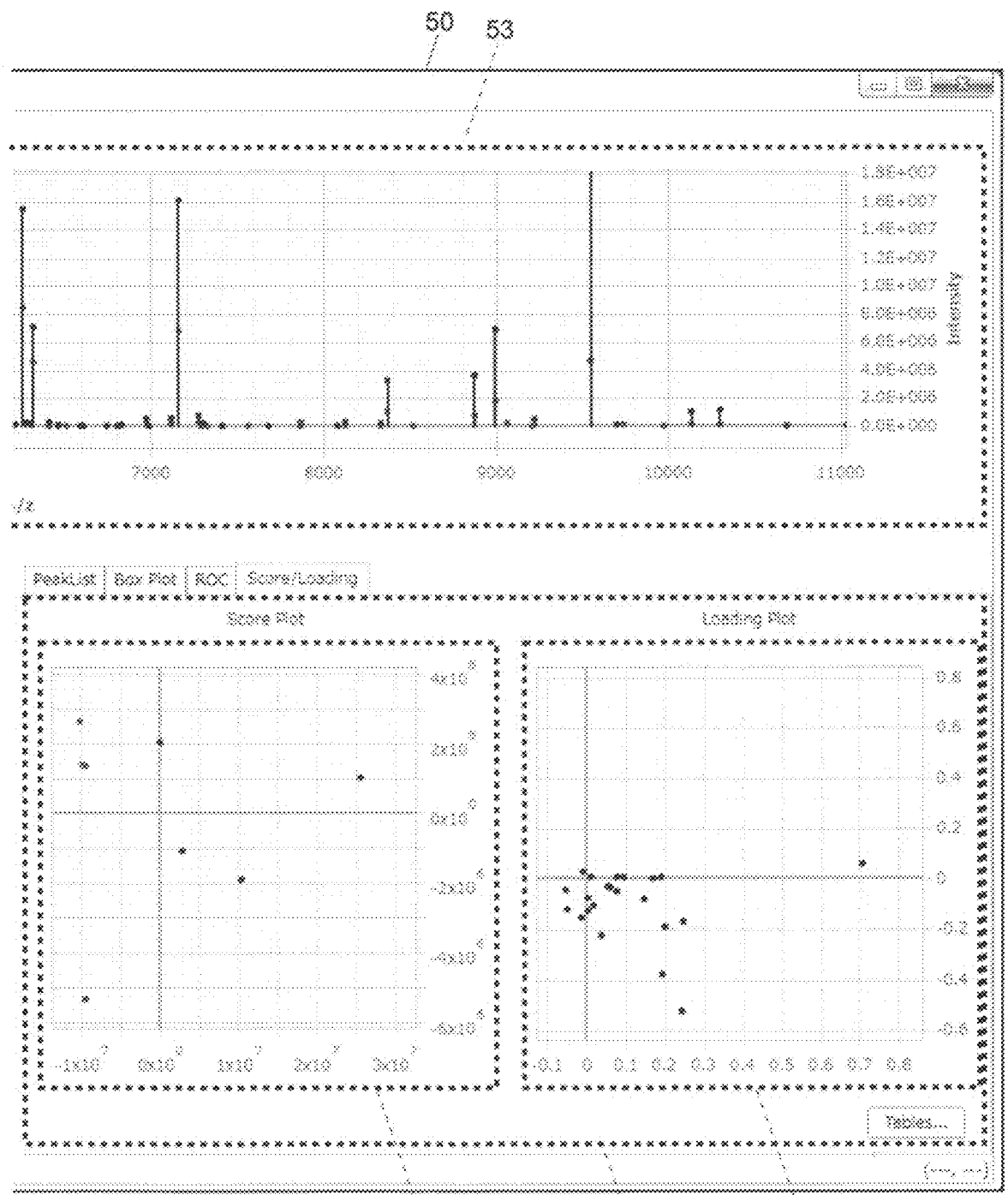
FIG. 6 is a drawing of another exemplified display (right half) on the analysis main screen in the mass spectrometric data analyzer according to the embodiment.

After the peak matrix is generated, the multivariate analyzer 14 applies a multivariate analysis to the peak matrix. Herein, one of PCA and PLS-DA is selectable as the multivariate analysis, as described later. The selected one of these methods is executed to generate a score plot and a loading plot both showing the multivariate analysis result (Step S4). The sample tree and the peak matrix generated in Step S3 and the score plot and the loading plot generated in Step S4 are all transmitted to the differential analysis display processor 19. As illustrated in FIGS. 5 and 6, the differential analysis display processor 19 displays the generated data and the analysis result in the sample tree display region 51, peak matrix display region 54, and multivariate analysis result display region 56 of the analysis main screen 50 displayed on the display unit 3 (Step S5). The sample tree, peak matrix, and multivariate analysis result (score plot and loading plot) may be displayed as soon as they are generated, instead of being displayed at once. On the mass spectrum display region 53 is displayed a mass spectrum on which peaks in all of the peak lists are superimposed, as illustrated in FIGS. 5 and 6.

When groups to be set in the sample tree and samples (peak lists) are confirmed, the sample tree and the peak matrix are generated and displayed and the multivariate analysis is executed and its result is displayed, automatically in succession, in response to the "OK" button 69 on the "Edit Sample Tree" dialog box 60 being clicked. As a result, the generated data and the analysis result are displayed in the respective display regions on the analysis main screen 50; the sample tree in the sample tree display region 51, the mass spectrum in the mass spectrum display region 53, the peak matrix in the peak matrix display region 54, and a score plot 561 and a loading plot 562 in the multivariate analysis result display region 56, as illustrated in FIGS. 5 and 6.

There are radio buttons for selecting one of multivariate analysis methods; PCA, and PLS-DA, in an analyzing method selecting section 58 in the analysis condition setting region 57. When one of the buttons is clicked, the multivariate analysis selected in this section starts.

The user, referring to the score plot 561 displayed in the multivariate analysis result display region 56 on the analysis main screen 50, checks whether samples of Group 1 and samples of Group 2 are distinctly separated between these groups. When it is confirmed that samples of these groups are distinctly separated, the user selects, on the loading plot 562 via the input unit 2, a plotted point assumed to contribute to the separation of samples between the groups as a marker candidate (one plotted point corresponds to one peak). Specifically, when a desired plotted point on the loading plot 562 or a position proximate to the plotted point is clicked with a pointing device, the plotted point can be selected (Step S6). The user may successively select a plurality of plotted points, instead of one. Instead of each plotted point being selected, a desired range on the loading plot 562 may be selected by a drag action using the pointing device to allow all of the plotted points included in the range to be collectively selected at once.

The designated marker candidate recognizer 16 correspondingly recognizes one or more selected plotted points. The peak matrix-multivariate analysis result cooperative processor 15 identifies the row, in the peak matrix, of a peak (mass-to-charge ratio value) corresponding to the selected plotted point. To distinguish the identified row from any other rows, the row may be highlighted, or its text color or background color may be changed (Step S7). In the example of FIGS. 5 and 6, the row corresponding to the selected plotted point (lowest row) is displayed in a different background color. This may allow the user to instantly know which of the rows in the peak matrix is a marker candidate peak selected by the user.

The user, who wants to confirm whether this marker candidate peak is a suitable marker contributing to the separation between two groups, clicks to uncheck a checkbox 55 for marker candidate peak exclusion on the left end of a row corresponding to the peak on the peak matrix displayed in the peak matrix display region 54 (Step S8). The checkmark in the checkbox 55 for marker candidate peak exclusion indicates that information of the peak corresponding to the row is reflected on the multivariate analysis, i.e., information of the peak is used in the multivariate analysis.

When any one of the checkboxes 55 for marker candidate peak exclusion is unchecked, the designated marker candidate peak exclusion recognizer 17 recognizes the checkmark-deleted row. The peak matrix generator 13 corrects the peak matrix by deleting peak information corresponding to the row. Then, the multivariate analyzer 14 continues to execute the same multivariate analysis based on the corrected peak matrix and accordingly generates a score plot and a loading plot (Step S9).

The differential analysis display processor 19 updates the multivariate analysis result in the multivariate analysis result display region 56 by replacing the score plot and the loading plot currently displayed with new ones (Step S10). In response to the checkbox 55 for marker candidate peak exclusion being checked or unchecked, the peak matrix is automatically corrected and the multivariate analysis is executed for the corrected peak matrix. As a result, the score plot and loading plot are updated and displayed.

In case a peak excluded when the relevant box is unchecked by the user is a suitable marker contributing to the separation between two groups, the separation between two groups may become indistinct or completely fail as a result of such a suitable marker being excluded from multivariate analysis targets. The user checks, on the score plot, the degree of separation between two groups and determines the relevant peak suitable as a marker when the group separation is unsatisfactory. When, on the other hand, the separation between two groups is distinct enough on the score plot, the user determines the relevant peak unsuitable as a marker. In the latter case, another plotted point may be selected as a marker candidate on the updated loading plot, and the checkbox 55 for marker candidate peak exclusion in the row accordingly discriminated on the peak matrix may be unchecked to find a correct marker. In the case of a plurality of marker candidates, such processing steps are repeatedly carried out until any peak that disables the group separation is finally found.

Even after the checkbox 55 for marker candidate peak exclusion corresponding to a row in the peak matrix is unchecked, the score plot; multivariate analysis result, may be readily checked by checking (simple click) the checkbox 55 in the same row to add the excluded peak to the peak matrix again. This may markedly simplify the labor of checking whether the marker candidate extracted on the loading plot, which is the multivariate analysis result, is a suitable marker. In the case of a plurality of marker candidates, which of them is a suitable marker may be readily and accurately determined.

Unlike the example of two groups, three or more groups may be handled as described below.

A large number of samples may be rarely dividable among three groups with just one marker (if it is possible, such a marker may be found in the steps described earlier). Supposing that there are three groups A, B, and C, typically, a marker may contribute to the separation between the group A and the other groups, while another marker may contribute to the separation between the group B and the other groups. With three or more groups, therefore, the following steps are repeatedly carried out; searching a marker that contributes to the separation of some samples between a certain group and the other groups and excluding samples of the certain group from analysis targets to remove one group, and then searching a marker that contributes to the separation of the remaining samples between another group and the other groups.

Figure 7:
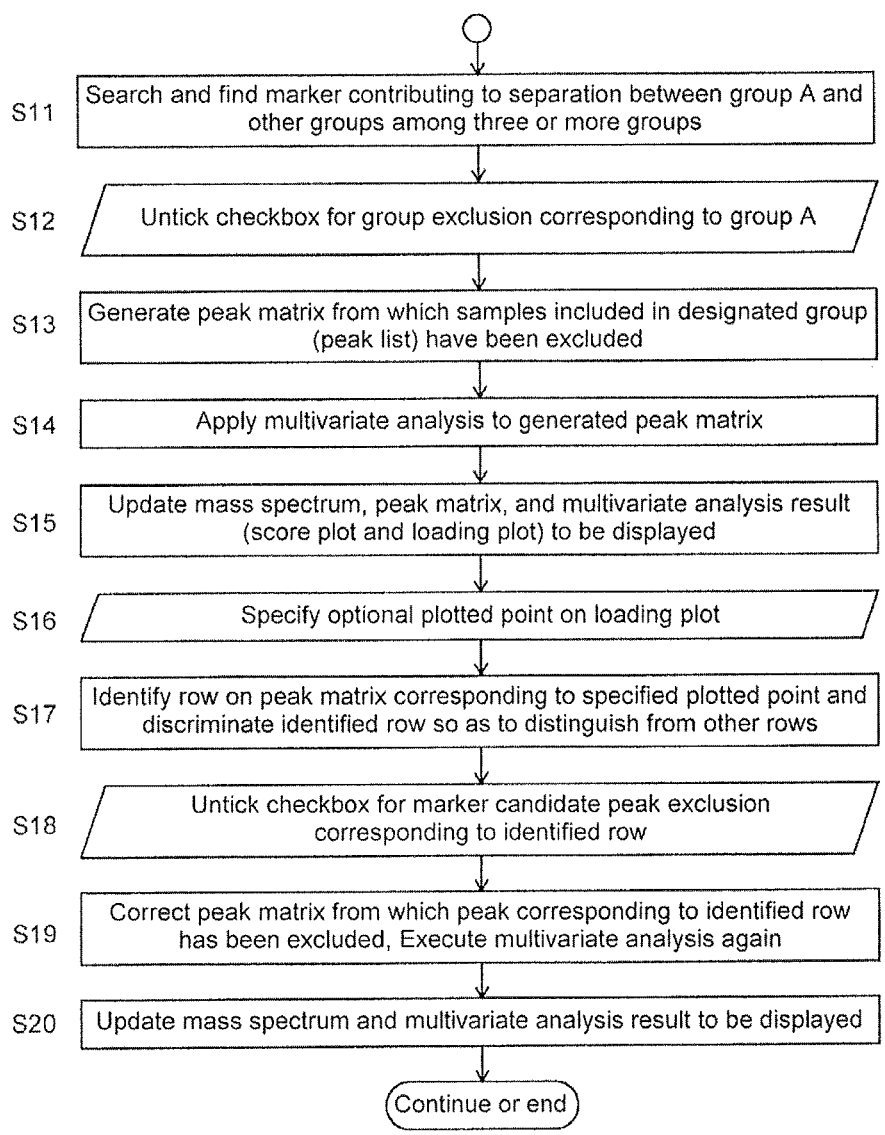
FIG. 7 is a flow chart in part of operational and processing steps in a marker search carried out for the case of three or more groups in the mass spectrometric data analyzer according to the embodiment.

This is described in further detail referring to FIG. 7. FIG. 7 is a flow chart to describe operational and processing steps additionally carried out when the number of groups is three or more. Referring to the flow chart of FIG. 3, first, a marker is searched and found that contributes to the separation between a group A and the other groups (Step S11). In the checkbox 52 for group exclusion on the left side of the group names (Group 1, Group 2 in the example of FIG. 5) in the sample tree displayed in the sample tree display region 51 of the analysis main screen 50 on the display unit 3, the user deletes a checkmark corresponding to the group A for which a separation-contributing marker has been found (Step S12). Any group with a checkmark in its checkbox 52 for group exclusion is a target for which the peak matrix generation and multivariate analysis are requested. Deleting the checkmark, therefore, means that the checkmark-deleted group will be excluded from the multivariate analysis targets.

When any one of the checkmarks in the checkbox 52 for group exclusion is deleted, the designated group exclusion recognizer 18 recognizes the checkmark-deleted group as a group to be excluded. The peak matrix generator 13 excludes peak lists corresponding to samples belonging to the group to be excluded and generates a peak matrix based on peak lists of the remaining groups (Step S13). Then, the multivariate analyzer 14 continues to execute the same multivariate analysis based on an updated peak matrix and accordingly generates a score plot and a loading plot (Step S14).

The differential analysis display processor 19 displays, in the respective display regions of the analysis main screen 50, the new peak matrix generated after the group exclusion, mass spectrum generated based on the peak matrix, and the score plot and loading plot accordingly obtained by the multivariate analysis. In response to the checkbox 52 for group exclusion being checked or unchecked, the peak matrix is automatically corrected and the multivariate analysis is applied to the corrected peak matrix. As a result, the peak matrix, mass spectrum, and multivariate analysis result; score plot and loading plot, are respectively updated (Step S15). All of pieces of information updated then reflect samples belonging to any groups but the group A.

Then, Steps S16 to S20, which are the same as those of Steps S6 to S10 described earlier, may be further carried out to search a marker contributing to the separation between one of the remaining groups and the other groups. In the case of four or more groups, Steps S11 to S20 may be repeatedly carried out to search markers, one at a time, contributing to the separation between one group and the other groups.

As described thus far, the mass spectrometric data analyzer according to this embodiment can enable simplified and accurate search of a marker (mass-to-charge ratio value or substance corresponding mass-to-charge ratio value) contributing to the separation of a large number of samples between two or more groups.

The embodiment is thus far described as an example of the present invention. What is described in the embodiment may be modified or corrected or may further include additional matters within the technical scope of the present invention described herein. Such modifications, corrections, and additions should naturally be encompassed by the appended claims.

For example, the mass spectrometric data to be analyzed in the embodiment may be MS$^n$ spectrometric data, where n is a value greater than or equal to 2. In the embodiment described earlier, PCA and PLS-DA alone are selectable as the multivariate analysis. It should be understood, however, any other suitable method may be acceptable insofar as grouping of multiple samples is possible or proximity between samples is visualizable in the form of an index value. The layout of the display regions on the analysis main screen 50 is not necessarily limited to what is illustrated in the embodiment.

REFERENCE SIGNS LIST

1 . . . Data Analyzing Unit
10 . . . Mass Spectrometric Data Storage
11 . . . Peak List Generator
12 . . . Sample Tree Generator
13 . . . Peak Matrix Generator
14 . . . Multivariate Analyzer
15 . . . Peak Matrix-Multivariate Analysis Result Cooperative Processor
16 . . . Designated Marker Candidate Recognizer
17 . . . Designated Marker Candidate Peak Exclusion Recognizer
18 . . . Designated Group Exclusion Recognizer
19 . . . Differential Analysis Display Processor
2 . . . Input Unit
3 . . . Display Unit
4 . . . Mass Spectrometer
50 . . . Analysis Main Screen
51 . . . Sample Tree Display Region
52 . . . Checkbox For Group Exclusion
53 . . . Mass Spectrum Display Region
54 . . . Peak Matrix Display Region
55 . . . Checkbox For Marker Candidate Peak Exclusion
56 . . . Multivariate Analysis Result Display Region
561 . . . Score Plot
562 . . . Loading Plot
57 . . . Analysis Condition Setting Region
58 . . . Analyzing Method Selecting Section
60 . . . "Edit Sample Tree" Dialog Box
61 . . . Group Setting Region
62 . . . Sample Setting Region
63 . . . "Add Group" Button 64 . . . "Remove Groups" Button
65, 68 . . . Arrow Button
66 . . . "Add Peak Lists" button
67 . . . "Remove Peak Lists" button
69 . . . "OK" button

The invention claimed is:

1. A mass spectrometric data analyzer configured to search an element selectable as a marker contributing to separation between a plurality of groups based on mass spectrometric data obtained through mass spectrometry of a plurality of samples each belonging to any one of the plurality of groups, the mass spectrometric data analyzer comprising:
  a) a peak matrix generator that arranges mass-to-charge ratio values of peaks on a mass spectrum in a row or column direction and arranges pieces of information for distinguishing the plurality of samples in the row or column direction based on the mass spectrometric data of given ones of the plurality of samples so as to generate a peak matrix in which signal strength values of the peaks are put as the elements;
  b) a multivariate analyzer that applies a predetermined multivariate analysis to the peak matrix generated by the peak matrix generator and that renders a multivariate analysis result in a graphical representation, the predetermined multivariate analysis being applied to group the plurality of samples or calculate a distance between the plurality of samples;
  c) a display processor that displays the peak matrix and the graphical representation of the multivariate analysis result on a display screen;
  d) a selected peak indicator that changes, in response to desired one or more plotted points being designated by a user on the graphical representation of the multivariate analysis result displayed on the display screen, a display of a row or a column in the peak matrix indicative of a peak corresponding to the desired one or more plotted points so as to distinguish from the other row or column; and
  e) a peak-to-be-excluded designator that receives the user's designation of a peak as a candidate of the marker on the peak matrix displayed on the display screen,
  wherein, by the multivariate analyzer, a modified peak matrix is obtained by excluding from the peak matrix a peak designated by the peak-to-be-excluded designator, the predetermined multivariate analysis is applied to the modified peak matrix, and a multivariate analysis result is rendered in a graphical representation.

2. The mass spectrometric data analyzer according to claim 1, further comprising a group-to-be-excluded designator that allows a user to designate desired one or more than one of the plurality of groups to be desirably excluded from multivariate analysis targets, wherein:
  the peak matrix generator generates a peak matrix based on the mass spectrometric data of any samples but samples included in the desired one or more than one of the plurality of groups designated by the group-to-be-excluded designator, and
  the multivariate analyzer applies a predetermined multivariate analysis to the peak matrix generated after the samples included in the desired one or more than one of the plurality of groups are excluded or a peak matrix obtained by excluding from the peak matrix the peak designated by the peak-to-be-excluded designator.

3. The mass spectrometric data analyzer according to claim 1, wherein:
  the multivariate analysis applied to the peak matrix by the multivariate analyzer is one of principal component analysis (PCA) or partial least squares-discriminant analysis (PLS-DA), and
  the graphical representation displayed on the display screen by the display processor is a loading plot or a score plot.

4. The mass spectrometric data analyzer according to claim 1, further comprises a means for selecting a plotted point of a marker candidate to be excluded from analysis targets on a graph showing the multivariate analysis result.

5. A non-transitory computer-readable medium recording a mass spectrometric data analyzing program for use in search of an element selectable as a marker contributing to separation between a plurality of groups based on mass spectrometric data obtained through mass spectrometry of a plurality of samples belonging to any one of the plurality of groups, the mass spectrometric data analyzing program causing a computer to carry out the following steps:
  a) a peak matrix generating step of arranging mass-to-charge ratio values of peaks on a mass spectrum in a row or column direction and arranging pieces of information for distinguishing the plurality of samples in the row or column direction based on the mass spectrometric data of given ones of the plurality of samples so as to generate a peak matrix in which signal strength values of the peaks are put as the elements;
  b) a multivariate analysis applying step of applying a predetermined multivariate analysis to the peak matrix generated in the peak matrix generating step and of rendering a multivariate analysis result in a graphical representation, the predetermined multivariate analysis being applied to group the plurality of samples or calculate a distance between the plurality of samples;
  c) a display processing step of displaying the peak matrix and the graphical representation of the multivariate analysis result on a display screen;
  d) a selected peak indicating step of changing, in response to desired one or more plotted points being designated by a user on the graphical representation of the multivariate analysis result displayed on the display screen, a display of a row or a column in the peak matrix indicative of a peak corresponding to the desired one or more plotted points and of discriminating the row or the column specified in the peak matrix displayed on the display screen so as to distinguish from the other row or column;
  e) a peak-to-be-excluded designating step of receiving the user's designation of a peak as a candidate of the marker on the peak matrix displayed on the display screen; and
  f) a multivariate analysis reapplying step of applying the predetermined multivariate analysis to a modified peak matrix obtained by excluding from the peak matrix a peak designated in the peak-to-be-excluded designating step and rendering a multivariate analysis result in a graphical representation.

6. The non-transitory computer-readable medium according to claim 5, the program further causing to carry out a group-to-be-excluded designating step of allowing the user to designate desired one or more than one of the plurality of groups to be desirably excluded from multivariate analysis targets, wherein:
  the peak matrix generating step generates a peak matrix based on the mass spectrometric data of any samples but samples included in the desired one or more than one of the plurality of groups designated in the group-to-be-excluded designating step, and the multivariate analysis applying step or the multivariate analysis reapplying step applies a predetermined multivariate analysis to the peak matrix generated after the samples included in the desired one or more than one of the plurality of groups are excluded or a peak matrix obtained by excluding from the peak matrix the peak designated in the peak-to-be-excluded designating step.

7. The non-transitory computer-readable medium according to claim 5, wherein:

the multivariate analysis applied to the peak matrix in the multivariate analysis applying step and the multivariate analysis reapplying step is one of principal component analysis (PCA) or partial least squares-discriminant analysis (PLS-DA), and the graphical representation displayed on the display screen in the display processing step is a score plot and a loading plot.

8. The non-transitory computer-readable medium according to claim 5, wherein the program further causes the computer to carry out a selecting step of selecting a plotted point of a marker candidate to be excluded from analysis targets on a graph showing the multivariate analysis result.

9. A mass spectrometric data analyzing method of searching an element selectable as a marker contributing to separation between a plurality of groups based on mass spectrometric data obtained through mass spectrometry of a plurality of samples each belonging to any one of the plurality of groups, the mass spectrometric data analyzer comprising the following steps:

a) a peak matrix generating step of arranging mass-to-charge ratio values of peaks on a mass spectrum in a row or column direction and arranging pieces of information for distinguishing the plurality of samples in the row or column direction based on the mass spectrometric data of given ones of the plurality of samples so as to generate a peak matrix in which signal strength values of the peaks are put as the elements;

b) a multivariate analysis applying step of applying a predetermined multivariate analysis to the peak matrix generated in the peak matrix generating step and of rendering a multivariate analysis result in a graphical representation, the predetermined multivariate analysis being applied to group the plurality of samples or calculate a distance between the plurality of samples;

c) a display processing step of displaying the peak matrix and the graphical representation of the multivariate analysis result on a display screen;

d) a selected peak indicating step of changing, in response to desired one or more plotted points being designated by a user on the graphical representation of the multivariate analysis result displayed on the display screen, a display of a row or a column in the peak matrix indicative of a peak corresponding to the desired one or more plotted points so as to distinguish from the other row or column;

e) a peak-to-be-excluded designating step of receiving the user's designation of a peak as a candidate of the marker on the peak matrix displayed on the display screen; and f) a multivariate analysis reapplying step of applying the predetermined multivariate analysis to a modified peak matrix obtained by excluding a peak designated in the peak-to-be-excluded designating step, and rendering a multivariate analysis result in a graphical representation.

10. The mass spectrometric data analyzing method according to claim 9, further comprising a group-to-be-excluded designating step of allowing the user to designate desired one or more than one of the plurality of groups to be desirably excluded from multivariate analysis targets, wherein:

the peak matrix generating step generates a peak matrix based on the mass spectrometric data of any samples but samples included in the desired one or more than one of the plurality of groups designated in the group-to-be-excluded designating step, and the multivariate analysis applying step or the multivariate analysis reapplying step applies a predetermined multivariate analysis to the peak matrix generated after the samples included in the desired one or more than one of the plurality of groups are excluded or a peak matrix obtained by excluding from the peak matrix the peak designated in the peak-to-be-excluded designating step.

11. The mass spectrometric data analyzing method according to claim 9, wherein:

the multivariate analysis applied to the peak matrix in the multivariate analysis applying step and the multivariate analysis reapplying step is one of principal component analysis (PCA) or partial least squares-discriminant analysis (PLS-DA), and the graphical representation displayed on the display screen in the display processing step is a score plot and a loading plot.

12. The computer-implemented mass spectrometric data analyzing method according to claim 9, further comprises a selecting step of selecting a plotted point of a marker candidate to be excluded from analysis targets on a graph showing the multivariate analysis result.

* * * * *